3,266,986
HYPNOTIC COMPOSITION CONTAINING REACTION PRODUCT OF CHLORAL HYDRATE AND ACETYLGLYCINEAMIDE
Edward A. A. Degerholm and Nils O. B. Sterner, Malmo, Sweden, assignors to A. B. Ferrosan, a corporation of Sweden
No drawing. Filed May 3, 1963, Ser. No. 277,682
Claims priority, application Sweden, May 9, 1962, 5,201/62
4 Claims. (Cl. 167—52)

The present invention concerns acetylglycineamide chloral hydrate. The invention more specifically concerns acetylglycineamide chloral hydrate, a process for the preparation of said compound as well as drugs containing acetylglycineamide chloral hydrate.

The use of chloral hydrate as a drug has been previously proposed and this compound has found use as a hypnotic. However, said compound has local irritating properties and is unsatisfactory on account of its smell and taste. Furthermore, it is difficult to manufacture and store chloral hydrate tablets on account of the low melting point and the high vapor pressure of the chloral hydrate. Attempts have been made to avoid said disadvantages by combining the chloral hydrate with other compounds without diminishing the chloral effect. Such combinations have been prepared and used clinically but they exhibit certain disadvantages. These disadvantages are that the compound, with which the chloral hydrate has been combined, has its own pharmacological action which is not wanted per se in said combination, or that the chemical bonding is of a type (semiacetal bonding), which according to practical experience increases the toxicity of the chloral hydrate (for instance chloralosis when the chloral hydrate is combined with glucose).

According to the present invention it has been found that a product consisting of a combination of acetyl glycineamide and chloral hydrate is especially advantageous. Such a product formed by the two components in equimolecular amounts has, similarly to the pure components, a sharply marked melting point, which shows that the product consists of a kind of addition or complex compound, whereas products in which the components are present in another relative amount show an extended melting range. This fact confirms that the equimolecular mixture consists of a molecular compound of one mole of acetyl glycineamide and one mole of chloral hydrate. The acetyl glycineamide chloral hydrate, which hereinbelow will be named AGAK, retains the chloral effect but the unpleasant taste and smell of the chloral hydrate is mainy eliminated. AGAK melts at 82–83° C. and thus the compound does not cause any difficulties when manufacturered into tablets.

Accordingly, the present invention is characterized by a new pharmacologically active drug, which drug without difficulties may be tabletted and does not show any undesirable taste or smell and which, furthermore, has substantially the same pharmacological activity as the amount of chloral hydrate present in the drug. The new drug is prepared by reacting acetyl glycineamide with chloral hydrate to the formation of acetyl glycineamide chloral hydrate. The reaction is suitably performed in an aqueous solution which is saturated with the two components.

Resorption tests on dogs, rats and humans have been made in order to verify the biochemical properties of AGAK. The resorption tests on dogs (two dogs in a cross over test) show that AGAK and chloral hydrate when perorally administered in equivalent doses (100 mg. chloral hydrate per kg. body weight) are resorbed with the same velocity and that the concentration curves for chloral hydrate and the two main metabolites trichloroethanol, which is regarded principally to cause the pharmacological action, and trichloro acetic acid are mainly identical. Thus, it seems to be proven that AGAK when resorbed is hydrolyized to free chloral hydrate.

In the resorption tests on rats two groups of 10 rats were perorally given 100 mg. chloral hydrae/kg. body weight and 170 mg. AGAK (=100 mg. chloral hydrate) per kg. body weight respectively, the two agents being in solution. Half an hour after the administration the rats were killed by throat-cuts and blood was obtained for determination of the content of chloral hydrate, trichloro ethanol and trichloro acetic acid [method: Friedman and Cooper, Anal. Chem., 30, 1674 (1958)]. The results of said experiments are given in Table I and concern mean values for 10 animals with error limits at $P=0.05$.

TABLE I

|  | Concentration ($\gamma$/ml.) | | |
| --- | --- | --- | --- |
|  | Chloral hydrate | Trichloro ethanol | Trichloro acetic acid |
| AGAK | 20.4 (16.7–24.1) | 13.7 (11.3–16.1) | 8.8 (7.7–9.9) |
| K | 24.5 (20.4–28.6) | 14.3 (12.1–16.5) | 9.7 (8.5–10.9) |

K means chloral hydrate.

It has not been possible to find any significant differences between the values obtained after the administration of AGAK and after the administration of chloral hydrate.

Resorption tests on human beings (4 volunteers in a cross over test) with determination of chloral hydrate, trichloro ethanol and trichloro acetic acid in blood ½, 1 and 2 hours after the peroral administration of 1 g. chloral hydrate and 1.7 g. AGAK (=1 g. chloral hydrate) resp. have completely confirmed the animal tests and thus it has been shown that AGAK when resorbed is rapidly hydrolyzed to its components.

For the evaluation of the pharmacological properties of AGAK a "biological value determination" was performed concerning the acute toxicity ($LD_{50}$) and the anesthetic action ($AD_{50}$) on mice with chloral hydrate as a standard. Table II shows the results obtained concerning $LD_{50}$ and $AD_{50}$ in mg. chloral hydrate/kg. body weight with error limits, which have been estimated according to Litchfield-Wilcoxon.

TABLE II

|  | $LD_{50}$ | $AD_{50}$ |
| --- | --- | --- |
| AGAK | 1,205 (1,030–1,410) | 525 (475–580) |
| K | 1,275 (1,215–1,340) | 485 (355–560) |

K means chloral hydrate.

Table II shows that AGAK and chloral hydrate had the same activity in the two tests. No significant difference could be observed at $P=0.05$. The acetyl glycineamide itself shows a very small acute toxicity and its $LD_{50}$-value exceeds 25 g./kg. General observations of the toxicity determinations show that acetyl glycineamide may be regarded as a pharmacologically inert substance even when administered in much larger doses than those used in clinical practice. When investigating the chronic toxicity of AGAK it has been found to be suitable to perform the tests on rats with acetyl glycineamide which was used partly with a view to the rapid hydrolyzing of AGAK and partly on account of the fact that the test animals could be given larger doses than when administering the new combination product of acetyl glycineamide and chloral hydrate. No toxic action was observed in chronic administration of acetyl glycineamide.

Thus, the pharmacological experiments show that a complete chloral effect is obtained in peroral administration of AGAK. The toxicity determinations confirm that acetyl glycineamide may be regarded as a pharmacologically inert substance.

AGAK tablets are stable and have only an insignificant smell of chloral. When a tablet is inserted into the mouth there is no immediate taste. A certain chloral taste is observed after a short while on account of the rapid hydrolyzing, but said taste is not especially marked in comparison with the taste of the other preparations of the same type. When the tablet is swallowed with water there are no displeasing effects at all. For elimination of the minor burning taste in mouth and throat the tablets may be covered by a thin coating, which for instance may consist of ethyl cellulose. For instance lactose, starch, methyl cellulose, ethyl cellulose, sorbitol, gum arabic, gelatine, alginic acid, silica, calcium silicate, calcium stearate, magnesium stearate, stearic acid and/or talcum may be added as a filler, binder, disintegrating and lubricating agent. Thus, it is clear that this invention contemplates the active drug and a pharmaceutically acceptable diluent. Colors may also be added to the tablets.

The present invention is further elucidated by the following examples.

*Example 1*

599 g. of finely powdered acetyl glycineamide was carefully mixed with 853 g. of finely powdered chloral hydrate. The homogenous mixture was transferred to a vessel provided with a mixer. 414 ml. of water was added and the mixture was heated with stirring on a water bath to a temperature of 50° C. A clear somewhat yellow solution was obtained, which was cooled in running water and then in a refrigerator. A well crystallized precipitate was obtained, which was filtrated and sucked dry and finally dried over NaOH in a desiccator. Yield 1107 g. Melting point 81–83° C.

From the mother liquor 190 ml. of water was evaporated in vacuo and a further precipitate was obtained, which after cooling of the mixture was filtrated and dried. Yield 167 g. Melting point 81–83° C. Total yield 1274 g. (87.7%). An analysis showed a chloral hydrate content of 59.0% (theoretically 58.75%).

For recrystallization 67.8 g. of the product were dissolved in 17 ml. of water at a temperature of 60° C. The solution was filtrated and cooled in a refrigerator and the precipitation formed was filtrated and dried over NaOH in a desiccator. Yield 50.7 g. Melting point 82–83° C.

*Example 2*

For the preparation of 1000 tablets with a content of AGAK corresponding to 0.5 g. chloral hydrate the following composition was found to be especially suitable.

|  | G. |
|---|---|
| AGAK | 850 |
| Colloidal silica | 10–50 |
| Starch (from maize or potato) | 5–50 |
| Alginic acid | 3–10 |
| Gum arabic | 5–15 |
| Colour, q.s. | |
| Talcum | 10–25 |
| Magnesium stearate | 2–5 |

The tablets may be manufactured in a conventional manner by wet granulation, comprising wetting with water or with a mixture of alcohol and water of the above-defined components except the lubricants. The granulate was dried at a temperature not exceeding 30° C. and was sieved (DIN 5–8) and mixed with the lubricants. Then the mixture was pressed in a tablet manufacturing device with a medium pressure to the formation of tablets which had a weight of 0.90–1.00 g.

Instead of wet granulation the substance may also be subjected to briquetting, i.e., a double compression according to known methods. The tablets thus obtained with a suitable convex external surface and with or without a dint were then covered, if so desired, with a suitable film forming substance, for instance ethyl cellulose. The tablets were then conventionally distributed in a solution of ethyl cellulose of a low viscosity in a suitable solvent. The following composition, calculated for 1000 tablets, was found to be especially suitable:

|  | G. |
|---|---|
| Eethyl cellulose, 50 cp. | 1–7.5 |
| Carbon tetrachloride | 50–150 |

Said solution was used for the application of 3–10 coatings.

What we claim is:
1. A pharmaceutic composition exhibiting hypnotic activity, said composition comprising
   (a) a compound formed by reacting substantially equimolar amounts of chloral hydrate and acetylglycineamide and
   (b) a pharmaceutically acceptable diluent, said compound being present in the composition in an amount necessary to produce hypnotic action.
2. A pharmaceutical composition as claimed in claim 1, which is in the form of a dosage unit tablet.
3. The tablet of claim 2, in which the amount of said compound corresponds to 0.5 gram of chloral hydrate.
4. The tablet as claimed in claim 2, wherein the tablet is coated with a pharmaceutically acceptable coating for the elimination of minor burning taste.

References Cited by the Examiner

UNITED STATES PATENTS

| 2,824,041 | 2/1958 | Bavley | 167—52 |
| 2,957,915 | 10/1960 | Kokorudz | 260—561 |
| 2,996,427 | 8/1961 | Robson | 167—52 |
| 3,092,661 | 6/1963 | Rosenblatt | 260—561 |

OTHER REFERENCES

Alimov. Chem. Abst., vol. 55, p. 18577d, 1961.

JULIAN S. LEVITT, *Primary Examiner.*

FRANK CACCIAPAGLIA, *Examiner.*

S. ROSEN, P. SABATINE, *Assistant Examiners.*